United States Patent
Ikebata et al.

(10) Patent No.: US 6,341,170 B2
(45) Date of Patent: Jan. 22, 2002

(54) ORGANISM COLLATION APPARATUS CAPABLE OF RANDOMLY SELECTING TYPE OR ORGANISM INFORMATION TO BE COLLATED

(75) Inventors: Yoshikazu Ikebata; Kazunaga Yoshida, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/128,550

(22) Filed: Aug. 4, 1998

(30) Foreign Application Priority Data

Aug. 4, 1997 (JP) .............................. 9-209289

(51) Int. Cl.[7] .............................................. G06K 9/00
(52) U.S. Cl. ....................................... 382/116; 340/5.8
(58) Field of Search .................. 382/115, 116, 382/117, 124, 125, 126, 127; 235/380 T; 340/825.3, 825.34; 704/246, 273; 902/4 T, 25 T; 351/200 T, 205, 206; 283/68 T; 356/71

(56) References Cited

U.S. PATENT DOCUMENTS 4,641,349 A * 2/1987 Flom et al. ................. 382/117
5,073,949 A * 12/1991 Takeda et al. .............. 382/115
5,815,252 A * 9/1998 Price-Francis ............... 356/71

FOREIGN PATENT DOCUMENTS

| EP | 762 340 | | 3/1997 |
|---|---|---|---|
| FR | 2 634 570 | | 1/1990 |
| JP | 61-175865 | | 8/1986 |
| JP | 63-124175 | * | 5/1988 |
| JP | 5-233896 | * | 9/1993 |

* cited by examiner

Primary Examiner—Samir Ahmed
(74) Attorney, Agent, or Firm—Foley & Lardner

(57) ABSTRACT

An organism collation apparatus capable of randomly selecting type of organism information to be collated is disclosed. A plurality of types of organism information owned by one human being like fingerprint patterns of the ten fingers are registered in advance for the different types like the "thumb of the right hand". One type is selected from among the plurality of types of registered organism information, and inputting of organism information of the selected type is indicated to a person to be collated. In this condition, inputted organism information is accepted, and the inputted organism information and the registered organism information of the selected type are collated with each other.

17 Claims, 5 Drawing Sheets

ORGANISM COLLATION APPARATUS CAPABLE OF RANDOMLY SELECTING TYPE OR ORGANISM INFORMATION TO BE COLLATED

BACKGROUND OF THE INVENTION

1. Field of the Invention

This invention relates to an organism collation method and apparatus utilized for confirmation of a person and so forth.

2. Description of the Related Art

Conventionally, various security systems which utilize organism information have been proposed. A fingerprint collation apparatus which is a representative one of such organism collation apparatus includes, for example, an information storage medium such as a RAM (Random Access Memory), a CCD (Charge Coupled Device), an information inputting device such as a camera, and an information processing apparatus such as a computer.

In such a fingerprint collation apparatus as described above, a fingerprint pattern is registered as organism information of one human being in advance in the information storage medium, and the fingerprint pattern of a person to be collated is inputted by the information inputting device. Then, the inputted fingerprint pattern and the registered information pattern are collated with each other by the information processing apparatus, and if the two fingerprint patterns match each other, then it can be recognized that the person to be collated is the registered person.

It is to be noted that, in addition to such a fingerprint collation apparatus which makes use of a fingerprint pattern as organism information as described above, a voiceprint collation apparatus which makes use of a voiceprint, an iris collation apparatus which makes use of an iris pattern and so forth are available as organism collation apparatus. Further, organism collation apparatus are divided into a person confirmation apparatus and a person identification apparatus. The person confirmation apparatus is an apparatus wherein organism information only of a particular one person is registered in advance and collation of organism information is performed to confirm and specify the person. Meanwhile, the person identification apparatus is an apparatus wherein organism information of a plurality of persons is registered in advance and collation of organism information is performed not to specify a particular person, but to identify whether or not the particular person is included in the plurality of registered persons.

Such organism collation apparatus as described above are used, for example, with a security system for limiting the human beings who can access a particular area. Organism information is part of the person the, and is neither known to the others like a password nor may it be stolen or copied like a key. Therefore, a security system which employs an organism collation apparatus is higher in security than the other security systems.

However, actually it is not impossible to copy organism information, and it is possible to cause an organism collation apparatus to recognize copied information. For example, where the organism information is a fingerprint pattern, it is possible to produce a model of a finger of a registered person whose fingerprint is copied and cause an organism collation apparatus to recognize the finger. On the other hand, when the organism information is a voiceprint, it is possible to record the voice of a registered person and cause an organism collation apparatus to recognize the voice.

In order to solve such a subject as described above, a fingerprint collation apparatus disclosed in Japanese Patent Laid-Open No. 175865/1986 collates information of a plurality of particular fingers in a predetermined order. Since the types and the order of the fingers to be collated are recognized only by the person concerned, the security of the fingerprint collation apparatus is higher than a fingerprint collation apparatus which effects only collation of a fingerprint.

However, with the fingerprint collation apparatus of the document mentioned above, since the types and the order of a plurality of fingers to be collated are set fixedly, security is not increased by a very high degree. Further, collation of a plurality of fingerprints in the order as described above makes collation operation complicated and requires much time.

In order to simplify the operation and reduce the collating operation time, the number of pieces of information to be collated should be reduced. However, this degrades part of security. Besides, if the person concerned should forget the order of the fingers to be collated, then even the person concerned is not able to cause the organism collation apparatus to recognize the person concerned.

SUMMARY OF THE INVENTION

It is an object of the present invention to provide an organism collation method and apparatus wherein the collating operation is simple and does not require much time and the security is high.

In order to attain the object described above, an organism collation apparatus of the present invention registers a plurality of pieces of organism information, which is different among different human beings and unique to the individuals, for different types determined in advance. Then, the organism collation apparatus selects at least one type at random from among the plurality of types of registered organism information, and indicates inputting of organism information of the selected type to a human being to be collated. Then, when organism information of the human being to be collated is inputted, the organism collation apparatus performs collation between the inputted organism information and the registered organism information in accordance with the selected type.

Accordingly, a person to be collated does not know the type of organism information to be collated till the point in time at which collation is performed. Consequently, an unrelated person who tries to mislead the organism collation apparatus to erroneous recognition must prepare a copy of all organism information in advance. However, since it is difficult to copy all the organism information of an unrelated person, the security in collation is increased.

Another organism collation apparatus of the present invention inputs and registers, when a plurality of pieces of organism information are to be registered in advance, the plurality of pieces of organism information in an order determined in advance. Accordingly, if a person to be collated inputs the plurality of pieces of indicated organism information in order into information inputting means, then the plurality of pieces of organism information inputted in this are collated by information collation means. Since the inputting of the plurality of pieces of organism information is executed in order, only one inputting device such as a CCD camera which forms the information inputting means is required.

Another organism collation apparatus of the present invention inputs and registers, when a plurality of pieces of organism information are to be registered in advance, the plurality of pieces of organism information at one time. Accordingly, if a person to be collated inputs the plurality of pieces of indicated organism information at one time into information inputting means, then the plurality of pieces of organism information inputted at one time are collated by information collation means. Since the inputting of the plurality of pieces of organism information is executed at a time, the operation of inputting organism information is simple and does not require time.

The above and other objects, features and advantages of the present invention will become apparent from the following description with reference to the accompanying drawings which illustrate examples of the present invention.

DETAILED DESCRIPTION OF THE PREFERRED EMBODIMENTS

First Embodiment

Figure 1:
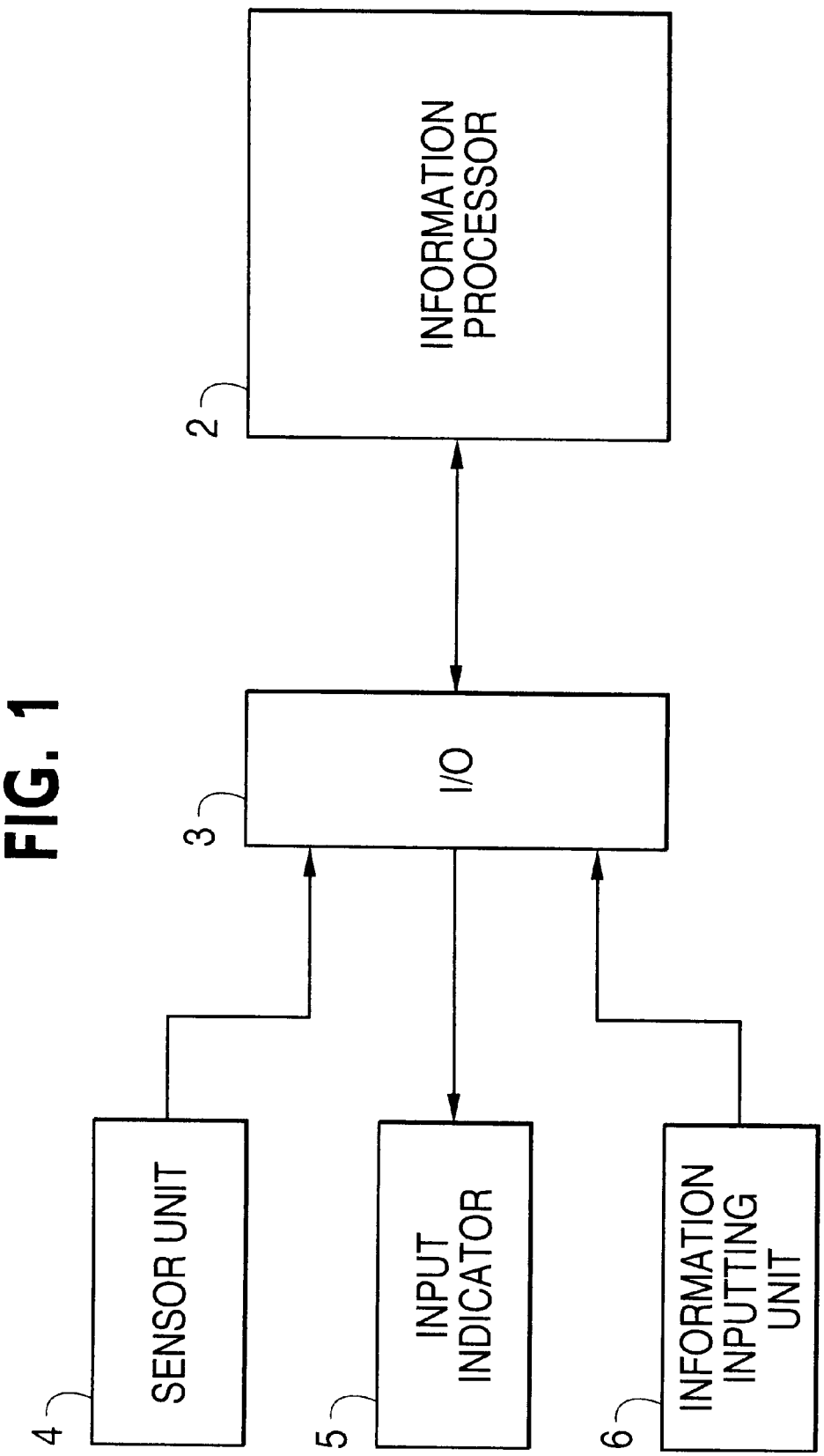
FIG. 1 is a block diagram showing a construction of an organism collation apparatus of a first embodiment of the present invention.

Organism collation apparatus of the present embodiment comprises information processor 2 as shown in FIG. 1. Sensor unit 4, input indicator 5 and information inputting unit 6 are connected to information processor 2 through I/O (Input/Output) port 3.

Figure 2:
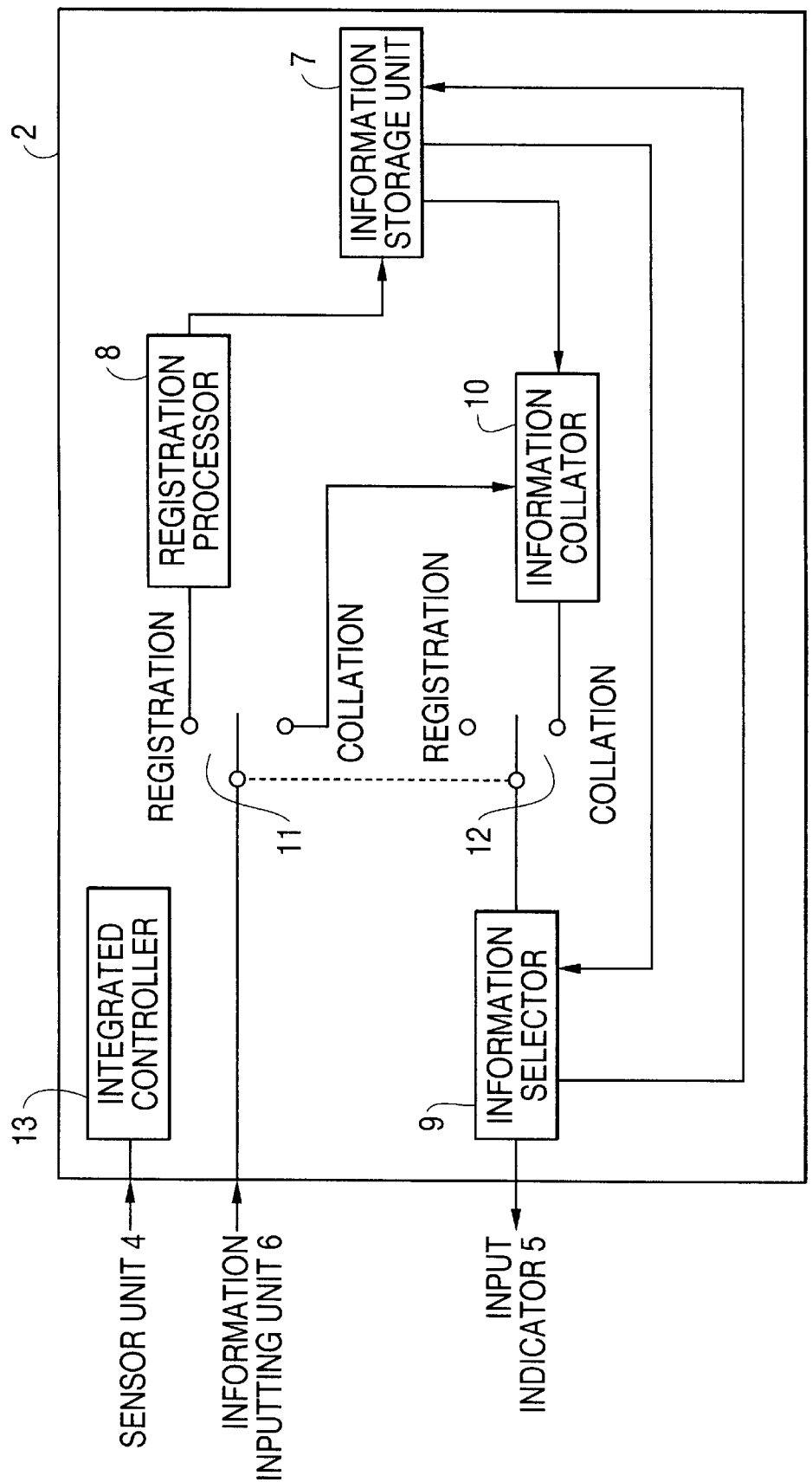
FIG. 2 is a block diagram showing a construction of information processor 2 in FIG. 1.

Information processor 2 comprises, as shown in FIG. 2, information storage unit 7, registration processor 8, information selector 9, information collator 10, changeover switch 11, on-off switch 12, and integrated controller 13.

Registration processor 8 and information collator 10 are connected to information inputting unit 6 through changeover switch 11. Also, information collator 10 is connected to information selector 9 through on-off switch 12, which operates in an interlocking relationship with changeover switch 11. Information selector 9 is connected to input indicator 5. Integrated controller 13 connected to components 7 to 12, as mentioned above, is also connected to sensor unit 4.

Information storage unit 7 is formed from a reloadable information recording medium such as a RAM and stores organism information for different types. In the present embodiment, as organism information to be used for collation, fingerprint patterns of the ten fingers of the two hands of one person are used. The fingerprint patterns are registered for the different types of the fingers such as the "thumb of the right hand" and the "little finger of the left hand" in information storage unit 7.

Integrated controller 13 is formed from, for example, a microcomputer in which a program is installed, and effects control of components 7 to 12 of information processor 2. Further, integrated controller 13 effects control to change over a set operation mode of information processor 2 between two modes of an information registration mode and an organism collation mode in response to a manual operation of a dip switch (not shown) or the like.

When the information registration mode is set, registration processor 8 is connected to information inputting unit 6 by changeover switch 11, and information collator 10 is disconnected from information selector 9 by on-off switch 12.

When the organism collation mode is set, information collator 10 is connected to information inputting unit 6 by changeover switch 11, and information selector 9 and information collator 10 are connected to each other by on-off switch 12.

Sensor unit 4 is formed from an optical sensor or an ultrasonic sensor and, when the organism collation mode is set, sensor unit 4 detects arrival of a human being and reports it to integrated controller 13. If detection of a human being is reported from sensor unit 4 while the organism collation mode is set, then integrated controller 13 controls information storage unit 7, information selector 9 and information collator 10 to execute collation operation of organism information.

Information selector 9 has registered therein type data of the ten fingers such as the "thumb of the right hand" and the "little finger of the left hand" which are types of organism information. If a human being is detected by sensor unit 4 while the organism collation mode is set, then information selector 9 utilizes, for example, a random number, a number corresponding to time (seconds) or the like to select one type at random from the plurality of type data registered in advance and outputs the selected type to input indicator 5.

Input indicator 5 is formed from an outputting device such as, for example, a CRT (Cathode-Ray Tube) display or an LED (Light Emitting Diode) panel and displays type data inputted thereto from information selector 9 in order.

Information inputting unit 6 is formed from an inputting device such as, for example, a CCD camera or a tactile sensor and inputs fingerprint patterns of the fingers in order. When the organism collation mode is set, since a plurality of fingerprint patterns are inputted in order from information inputting unit 6 through changeover switch 11, the plurality of fingerprint patterns inputted in order are collated in order with the fingerprint patterns of the same types registered in information storage unit 7.

It is to be noted that integrated controller 13 controls, when the information registration mode is set, information storage unit 7, registration processor 8 and information selector 9 to execute registration operation of organism information. When the information registration mode is set, information selector 9 selects all of the type data of the ten fingers in order and outputs them to input indicator 5. Consequently, input indicator 5 display outputs all of the type data of the ten fingers inputted from information selector 9 in order.

Information inputting unit 6 accepts inputs of all of the fingerprint patterns of the ten fingers in order, and, when the information registration mode is set, since all of the fingerprint patterns of the ten fingers are inputted in order from information inputting unit 6 through changeover switch 11, registration processor 8 registers all of the fingerprint patterns inputted in order into information storage unit 7 together with the type data outputted from information selector 9.

It is to be noted that integrated controller 13 can switchably set, as a lower order operation mode of the organism collation mode, a single collation mode in addition to the plural collation mode described above. While, when the plural collation mode is set, a plurality of fingerprint patterns are collated as described above, when the single collation mode is set, a single fingerprint pattern is selected at random and used for collation.

In organism collation apparatus of the present embodiment having such a construction as described above, fingerprint patterns of the ten fingers of a particular one person are registered, and the person can be confirmed by collation of fingerprint patterns. In this instance, since a plurality of fingerprint patterns are selected at random from among the fingerprint patterns of the ten fingers so as to be used for collation, the security is high.

Figure 3:
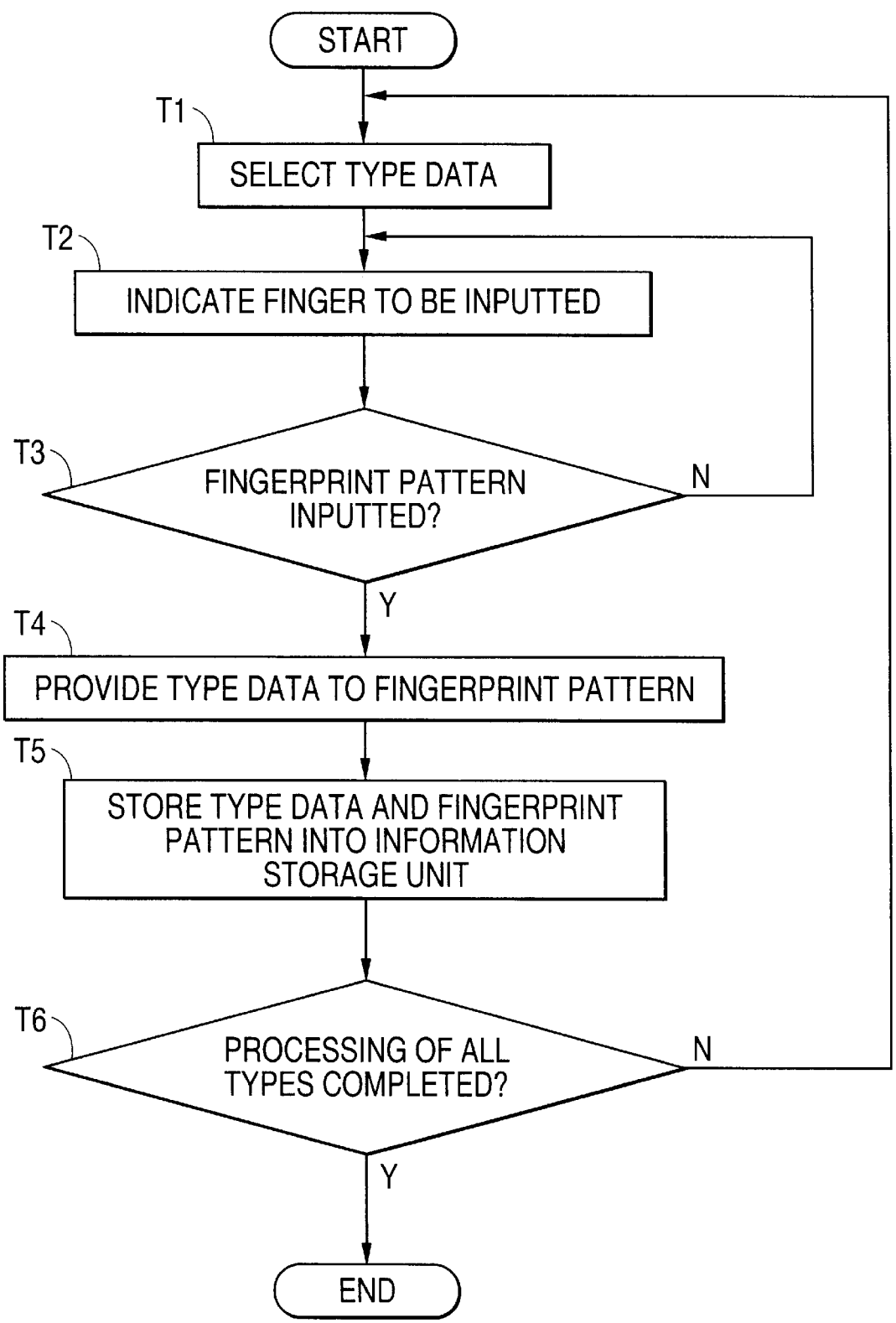
FIG. 3 is a flow chart illustrating an information registration method by the organism collation apparatus of FIG. 1.
Figure 4:
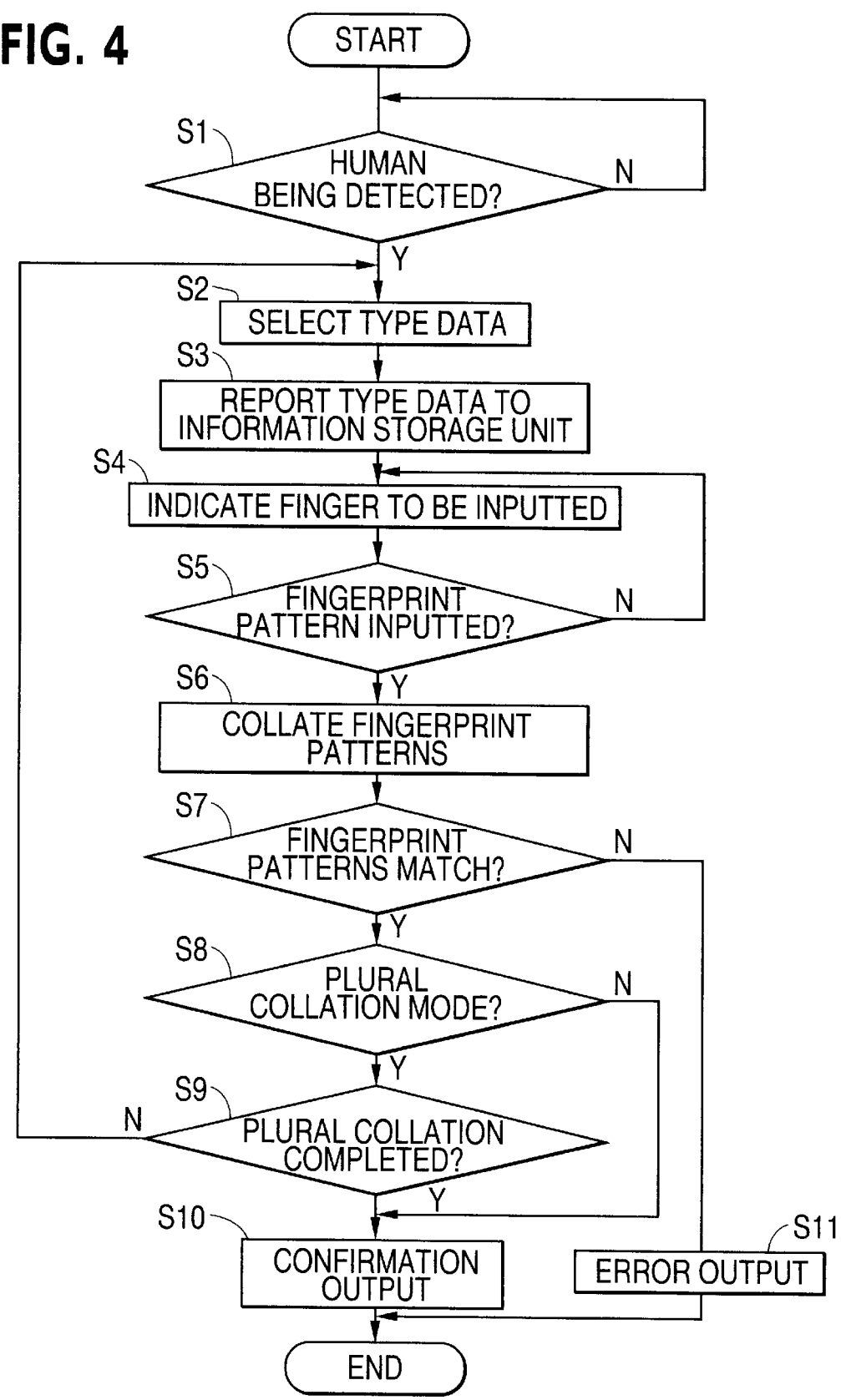
FIG. 4 is a flow chart illustrating an organism collation method by the organism collation apparatus of FIG. 1.

In the following, operation of the present embodiment is described with reference to flow charts of FIGS. 3 and 4.

First, operation of organism collation apparatus of the present embodiment in the information registration mode is described with reference to the flow chart of FIG. 3.

First, if the information registration mode is set by integrated controller 13, then information selector 9 selects one type data from among the type data of the ten fingers at step T1. Consequently, the type data are converted into a guidance such as "please press the thumb of the right hand against the inspection part" and display outputted by input indicator 5 at step T2.

If the human being who has confirmed the display guidance causes the finger corresponding to the display to be read by information inputting unit 6 at step T3, then type data is provided to the thus inputted fingerprint pattern by registration processor 8 at step T4 and the fingerprint pattern with the type data is stored into information storage unit 7 at step T5. Such processing operations (steps T1 to T5) as described above are repeated until fingerprint patterns of all of the ten fingers are registered at step T6.

All of the fingerprint patterns of the ten fingers of the one person are registered into organism collation apparatus by such processing operations as described above. Consequently, organism collation apparatus establishes a condition wherein it can perform collation of fingerprint patterns.

Next, operation of organism collation apparatus of the present embodiment in the organism collation mode is described with reference to FIG. 4.

First, if sensor unit 4 detects the arrival of a human being at step S1, then information selector 9 selects one type data from among the type data of the ten fingers at step S2. Then, the type data is reported to information storage unit 7 at step S3.

Further, the type data selected in such a manner as described above is converted into a guidance such as "please press the thumb of the right hand against the inspection part" and is display outputted by input indicator 5 at step S4. If the human being who has confirmed the display guidance causes the corresponding finger to be read by information inputting unit 6 at step S5, then the thus inputted fingerprint pattern and the fingerprint pattern read in accordance with the type data from information storage unit 7 are collated with each other by information collator 10 at step S6.

Then, if the thus collated two fingerprint patterns match each other at step S7, then it is determined at step S8 whether the collation mode is the plural collation mode or the single collation mode. If the plural collation mode is set, then the processing operations from the selection to the collation of type data (steps S2 to S7) described hereinabove are repeated until a number of times set in advance is reached at step S9. But when the single collation mode is set, the processing operations mentioned above are performed only once.

If the finger pattern matching is detected until the number of times set in advance is reached in this manner, then since the confirmation of the person is completed at step S10, for example, an unlocking operation of an electronic lock connected to organism collation apparatus is executed. It is to be noted that, if matching of fingerprint patterns is not confirmed even once during such a collation process as described above, then it is determined at this point of time that the person is not registered, and the operation is ended at step S11.

Organism collation apparatus of the present embodiment can confirm a particular one person by collation of fingerprint patterns as described above. In this instance, since the type of a finger to be collated is designated at random, it is difficult, for example, for an unrelated person to prepare a model of a finger and input it to organism collation apparatus, and the security is high.

Besides, in the plural collation mode, since a plurality of types of fingers are selected at random and used for collation, the security is very high. On the other hand, when the single collation mode is set, since collation of a finger is completed by only one operation, the operation is simple and does not require much time.

While it is described in the foregoing embodiment that fingerprint patterns of the ten fingers are utilized as a plurality of types of information which are owned by one person, a retina pattern, a voiceprint pattern or a palmprint can be used as such organism information. For example, where a voiceprint pattern is utilized, it is possible to register utterances of "0 to 9" in advance and select them at random upon collation. Further, it is possible to utilize a fingerprint pattern, a retina pattern, a voiceprint pattern and a palmprint pattern in an arbitrary combination.

Further, while it is described in the foregoing embodiment that a plurality of types of organism information of one person are registered in advance and the person is confirmed by collation of the organism information, also it is possible to register a large number of pieces of organism information of a plurality of persons in advance and identify an inspected person by collation of the organism information.

In this instance, the large number of pieces of organism information of the plurality of persons should be registered for different types in information storage unit 7, and upon collation, the organism information of the plurality of persons registered should be read out in accordance with a type and the organism information and inputted organism information should be collated with each other to identify the person.

In this instance, if a plurality of types of organism information are used for the collation, then upon collation, a plurality of pieces of organism information inputted for the plurality of selected types should individually be collated with the plurality of pieces of organism information registered for the plurality of selected types and it should be confirmed that the pluralities of pieces of information which exhibit matching are derived from one human being.

Second Embodiment

Figure 5:
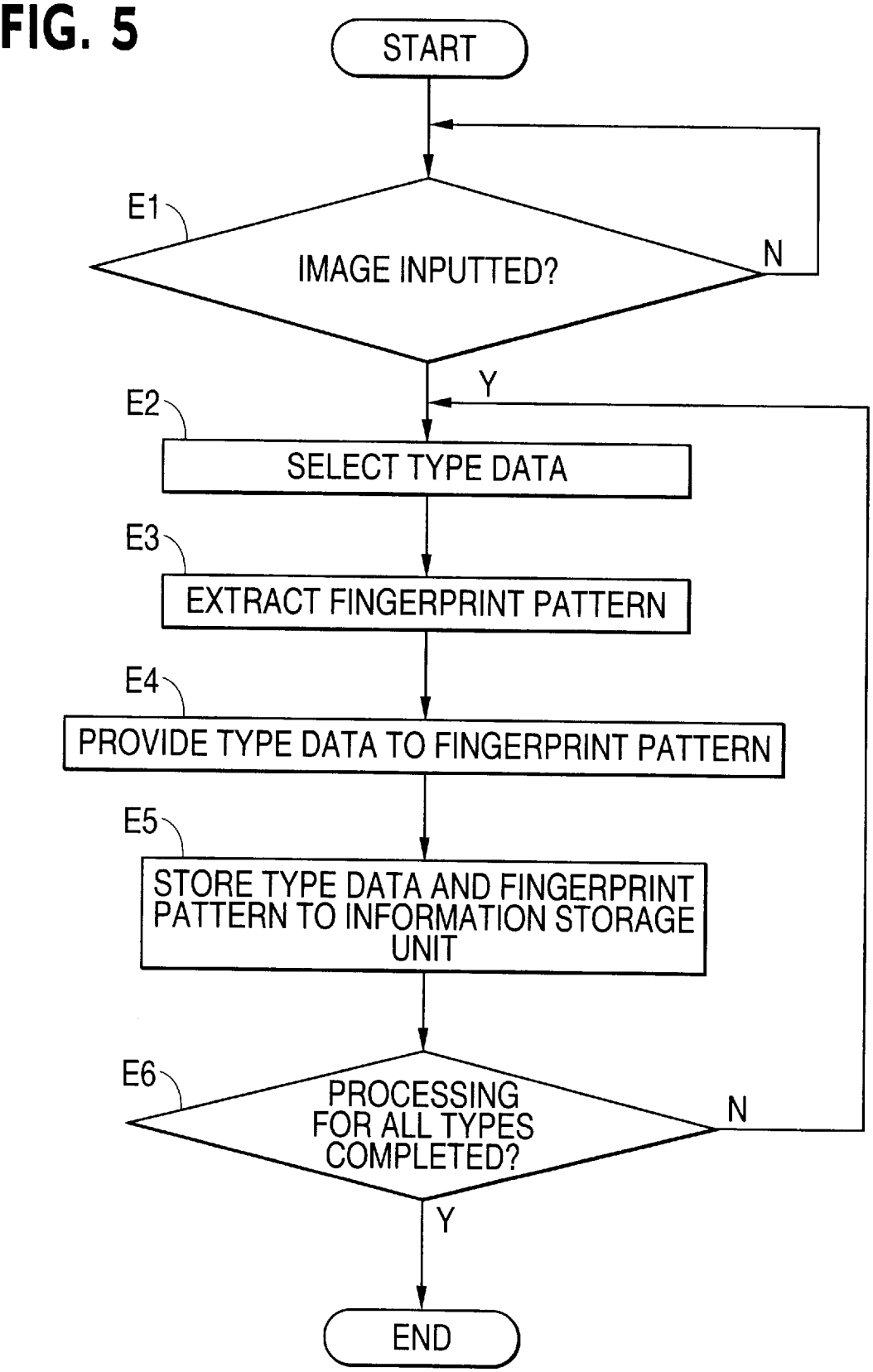
FIG. 5 is a flow chart illustrating an information registration method by an organism collation apparatus of a second embodiment of the present invention.

While, in the first embodiment described above, a plurality of pieces of organism information are registered in order, the organism collation apparatus of the present embodiment registers a plurality of pieces of organism information at one time as seen from the flow chart of FIG. 5.

For example, when fingerprint patterns of the ten fingers are inputted as organism information as described above, image data of the two hands are inputted by information inputting unit 6 which has a large size and has a high resolution at step E1, and one of the type data of the ten fingers is selected at step E2, thereafter a fingerprint pattern of the type data is extracted from the image data at step E3.

Type data is provided in accordance with the fingerprint pattern extracted in this manner at step E4, and the fingerprint pattern and the type data are stored into information storage unit 7 at step E5. Then, such processing operations as described above (steps E2 to E5) are repeated until they are completed for all of the ten fingers at step E6.

In this instance, while a CCD camera of a large size and a high resolution which reads image data of the two hands at one time, an information processing apparatus which recognizes the fingers from the image data of the two hands and extracts fingerprint patterns, and so forth are required as information inputting unit 6, since inputting of a plurality of pieces of organism information is completed by one operation, the operation for inputting organism information is simple and does not require much time.

Further, while, in the embodiments described above, the various means of organism collation apparatus and information processor 2 are individually formed as hardware units for exclusive use, it is also possible, for example, to form information processor 2 as a single computer and realize the functions of components 7 to 13 which are such various means by installing software.

Where the various means of information processor 2 are realized by software as described above, an information recording medium such as a RAM should have a program stored therein for causing the computer to execute a process of selecting, upon collation, at least one of a plurality of types of organism information registered in advance, another process of causing input indicator 5 to indicate inputting of organism information of the selected type, a further process of accepting organism information inputted from information inputting unit 6, and a still further process of collating to the inputted organism information and the registered organism information of the selected type with each other.

While preferred embodiments of the present invention have been described using specific terms, such description is for illustrative purposes only, and it is to be understood that changes and variations may be made without departing from the spirit or scope of the following claims.

What is claimed is:

1. An organism collation method, comprising the steps of:
   (a) registering a plurality of pieces of organism information, which is different among different human beings and unique to the individuals, for types determined in advance;
   (b) selecting at least one type at random from the plurality of types of registered organism information;
   (c) indicating inputting of first organism information of the selected type to a human being to be collated;
   (d) inputting said first organism information of the human being to be collated; and
   (e) first collating the first inputted organism information with the first registered organism information in accordance with the selected type and when said first inputted organism information matches the first registered organism information of the selected type, then performing the following steps;
   (f) subsequent to step (d) and (e) indicating inputting of second organism information of the at least one selected type to said human being to be collated;
   (g) inputting said second organism information of the human being to be collated;
   (h) second collating the second inputting information with the second registered organism information in accordance with the selected type; and
   (i) verifying said individual only if at least said first and second collating steps indicate identity of said first and second inputted organism information with said first and second registered organism information respectively.

2. An organism collation method as claimed in claim 1, wherein the step of registering a plurality of pieces of organism information includes a step of inputting and registering the organism information in an order determined in advance.

3. An organism collation method as claimed in claim 1, wherein the step of registering a plurality of pieces of organism information includes a step of inputting and registering the organism information at one time.

4. An organism collation method as claimed in claim 1, wherein the first and second organism information are fingerprint patterns.

5. An organism collation method as claimed in claim 1, wherein the first and second organism information are iris patterns.

6. An organism collation method as claimed in claim 1, wherein the first and second organism information are palmprint patterns.

7. An organism collation method as claimed in claim 1, wherein the first and second organism information are retina patterns.

8. An organism collation method as claimed in claim 1, wherein the first and second organism information are composed of a combination of a fingerprint pattern, an iris pattern, a palmprint pattern and a retina pattern.

9. An organism collation apparatus, comprising:
   (a) means for registering a plurality of pieces of organism information, which is different among different human beings and unique to the individuals, for types determined in advance;
   (b) means for selecting at least one type at random from the plurality of types of registered organism information;
   (c) means for indicating inputting of first organism information of the selected type to a human being to be collated;
   (d) means for inputting said first organism information of the human being to be collated; and
   (e) means for first collating the first inputted organism information with the first registered organism information in accordance with the selected type;
   (f) means operative when said first inputted organism information matches the first registered organism information of the selected type for indicating inputting of second organism information of the at least one selected type to said human being to be collated;
   g) means for inputting said second organism information of the human being to be collated; means for second collating the second inputting information with the second registered organism information in accordance with the selected type; and
   i) means for verifying said individual only if at least said first and second collating means indicate identity of said first and second inputted organism information with said first and second registered organism information respectively.

10. An organism collation apparatus as claimed in claim 9, wherein said information inputting means includes means for inputting the plurality of types of organism information in a predetermined order.

11. An organism collation apparatus as claimed in claim 9, wherein said information inputting means includes means for inputting the plurality of types of organism information at one time.

12. An organism collation apparatus as claimed in claim 9, wherein the at least first and second organism information are fingerprint patterns.

13. An organism collation apparatus as claimed in claim 9, wherein the at least first and second organism information are iris patterns.

14. An organism collation apparatus as claimed in claim 9, wherein the at least first and second organism information are palmprint patterns.

15. An organism collation apparatus as claimed in claim 1, wherein the at least first and second organism information are retina patterns.

16. An organism collation method as claimed in claim 1, further comprising a step of:
  detecting an arrival of a human being, and
  performing the steps (b)–(i) upon detection of the arrival of the human being.

17. An organism collation apparatus as claimed in claim 9, wherein the at least first and second organism information are composed of a combination of a fingerprint pattern, and iris pattern, a palmprint pattern and a retina pattern.

* * * * *